US007988188B2

(12) United States Patent
Zauritz et al.

(10) Patent No.: US 7,988,188 B2
(45) Date of Patent: Aug. 2, 2011

(54) SIDE AIRBAG HAVING HOSE AS VENTILATION OPENING

(75) Inventors: Ralf Zauritz, Holzkirchen (DE); Ernst Wittmann, Hebertshausen (DE); Udo Laube, Wasserburg (DE); Christoph Goertz, Roehrmoos (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/671,311

(22) PCT Filed: Aug. 1, 2008

(86) PCT No.: PCT/EP2008/006363
§ 371 (c)(1),
(2), (4) Date: Jan. 29, 2010

(87) PCT Pub. No.: WO2009/015902
PCT Pub. Date: Feb. 5, 2009

(65) Prior Publication Data
US 2010/0194084 A1 Aug. 5, 2010

(30) Foreign Application Priority Data

Aug. 2, 2007 (DE) .......................... 10 2007 036 534

(51) Int. Cl.
*B60R 21/16* (2006.01)
(52) U.S. Cl. ..................................... 280/730.2; 280/736
(58) Field of Classification Search .............. 280/730.2, 280/736, 739, 740, 743.1, 743.2
See application file for complete search history.

(56) References Cited

U.S. PATENT DOCUMENTS

| 3,887,213 A | 6/1975 | Goetz |
| 5,310,215 A | 5/1994 | Wallner |
| 5,492,363 A | 2/1996 | Hartmeyer et al. |
| 5,931,497 A | 8/1999 | Fischer |

(Continued)

FOREIGN PATENT DOCUMENTS

DE 4137810 C1 4/1993

(Continued)

OTHER PUBLICATIONS

International Search Report—PCT/EP2005/009260—Mailed Nov. 30, 2005.

*Primary Examiner* — Faye M. Fleming
(74) *Attorney, Agent, or Firm* — Brinks Hofer Gilson & Lione

(57) ABSTRACT

A side airbag (10) for a motor vehicle comprises an airbag shell that surrounds a gas compartment and has at least one opening. A hose (20) has an outlet opening (22) and is located on the outside of the airbag shell. When the hose is in a state in which it is not under pressure, the hose connects the opening (16) to the outlet opening (22), and thereby to the surrounding area. The hose (20) comprises a first section (20a), which is situated at the height of the opening (16), and a second section (20b), which connects the first section (20a) to the outlet opening (22). The ventilation arrangement composed of the opening (16) and the hose (20) is used to make the side airbag hard for a large occupant and soft for a small occupant. In order to improve the behavior of the side airbag for a small occupant, without impairing the behavior thereof for a large occupant, the maximum cross-section of the first section (20a) is larger than the minimum cross-section of the second section (20b).

10 Claims, 4 Drawing Sheets

U.S. PATENT DOCUMENTS

| | | | |
|---|---|---|---|
| 6,056,318 A | 5/2000 | Braunschadel | |
| 6,126,196 A | 10/2000 | Zimmerman | |
| 6,206,411 B1 * | 3/2001 | Sunabashiri | 280/730.2 |
| 6,419,267 B1 | 7/2002 | Hashimoto et al. | |
| 6,554,313 B2 | 4/2003 | Uchida | |
| 6,712,384 B2 | 3/2004 | Abe | |
| 6,783,151 B2 | 8/2004 | Rasch et al. | |
| 6,817,624 B2 | 11/2004 | Lorenz et al. | |
| 6,863,304 B2 * | 3/2005 | Reiter et al. | 280/739 |
| 7,017,945 B2 | 3/2006 | DePottey et al. | |
| 7,347,450 B2 | 3/2008 | Williams et al. | |
| 7,475,904 B2 | 1/2009 | Hofmann et al. | |
| 7,523,891 B2 | 4/2009 | Hakki et al. | |
| 7,635,148 B2 * | 12/2009 | Sager | 280/739 |
| 7,651,130 B2 | 1/2010 | Bauberger | |
| 2002/0096869 A1 | 7/2002 | Kai et al. | |
| 2003/0020268 A1 | 1/2003 | Reiter et al. | |
| 2003/0168836 A1 | 9/2003 | Sato et al. | |
| 2005/0184493 A1 | 8/2005 | Hofmann et al. | |
| 2007/0052222 A1 | 3/2007 | Higuchi et al. | |
| 2007/0057492 A1 | 3/2007 | Feller et al. | |
| 2007/0187932 A1 | 8/2007 | Sekizuka | |
| 2007/0273133 A1 | 11/2007 | Zauritz et al. | |
| 2009/0014989 A1 | 1/2009 | Henderson et al. | |
| 2009/0189374 A1 | 7/2009 | Fukawatase et al. | |

FOREIGN PATENT DOCUMENTS

| | | |
|---|---|---|
| DE | 19714266 A1 | 11/1997 |
| DE | 10018170 A1 | 10/2001 |
| DE | 102004042209 | 9/2004 |
| DE | 102004048898 A1 | 9/2006 |
| EP | 1338480 A2 | 8/2003 |
| EP | 1044855 B1 | 12/2003 |
| JP | 08268213 | 10/1996 |
| JP | 2002-79905 A | 3/2002 |
| WO | WO 2006/007964 A2 | 1/2006 |
| WO | WO 2009/015902 A1 | 2/2009 |

* cited by examiner

SIDE AIRBAG HAVING HOSE AS VENTILATION OPENING

CROSS REFERENCE TO RELATED APPLICATION

This application claims priority to PCT patent application PCT/EP2008/006363 filed Aug. 1, 2008 and German Patent Application DE 10 2007 036 534.0 filed Aug. 2, 2007.

FIELD OF THE INVENTION

The present invention relates to a side airbag for a motor vehicle and a vehicle seat for arrangement of the side airbag.

BACKGROUND OF THE INVENTION

A general problem with airbags, which in a motor vehicle serve to protect an occupant in the event of an accident (e.g. collision), is seen in that the occupants can vary considerably with respect to weight and size. Preferably for optimum protection, the airbag should be softer for a lightweight occupant than for a heavy occupant.

In patent application DE 10 2004 048 898 A1, a side airbag, among other things, is described that has an opening in the airbag shell, and on said airbag shell a hose is arranged that extends from the opening substantially horizontally (in the installed and deployed state) on the airbag shell. If the gas generator associated with the airbag is actuated, and the airbag does not strike an obstacle, gas flows out of the gas chamber surrounded by the airbag shell through an opening and the hose to an outlet of a hose and exits the airbag.

The airbag described in DE 10 2004 048 898 A1 is arranged in such a way in the motor vehicle that when the airbag is completely expanded, the hose is situated at the height of the shoulder in the case of a large occupant. If the shoulder hits the impact surface of the airbag, it compresses the hose and stops or at least curbs the gas flow out of the gas chamber of the gas bag, so that the airbag remains relatively hard. In the case of a small occupant, on the other hand, the shoulder area makes impact below the hose with the impact surface, the hose remains open and the airbag becomes relatively soft.

Further enhancements in a generic airbag in such a way that the protective function thereof for a small, lightweight occupant is improved without impairing the protective function thereof for a large and heavy occupant may be desireable.

SUMMARY OF THE INVENTION

In at least one embodiment of the present invention, an improved side airbag preferably part of a vehicle seat is provided. The side airbag comprises an airbag shell that surrounds a gas compartment and has at least one opening, and a hose that has an outlet opening. The hose is situated on the outside of the airbag shell and in a state in which it is not under pressure connecting the opening to the outlet opening and thereby to the surrounding area. The hose having a first section that is situated at the height of the opening and a second section that connects the first section to the outlet opening. The maximum cross-section of the first section is great than the minimum cross-section of the second section. A vehicle seat is provided, on the backrest of which the side airbag is arranged.

Experiments have shown that with a geometry as shown in DE 10 2004 048 898 A1, the gas outflow through the ventilation device formed by the opening and the hose is often not sufficient in the case of a small occupant who does not block the hose, to achieve an ideal softness for the small and lightweight vehicle occupant. Patent Application DE 10 2004 048 898 A1 has corresponding U.S. Patent Application Publication 2007/0273133, the disclosure of which is incorporated herein in its entirety by reference.

One possibility of improving this would fundamentally consist of enlarging the cross-section of the opening and the cross-section of the hose, so that there is greater gas emanation. However, it has been shown that enlarging the cross-section of the hose often causes the hose to no longer be sufficiently closed in the case of a large occupant, so that the protective effect for the large occupant is correspondingly limited.

It is usually assumed that in systems through which fluid flows, the maximum flow rate is determined by the point in the system that has the smallest cross-section (bottleneck principle). However, it has been demonstrated that this does not apply, at least not unconditionally, to the ventilation device of interest here. In fact, the maximum flow rate is substantially determined by the section of the hose that is situated at the height of the opening in the airbag shell.

This is apparently due, on the one hand, to the gas flow in this section being deflected by approximately 90°. An additional aspect seems to be that side airbags are often distinctly egg-shaped, which is to say that the surfaces thereof have a definite curve. In this way, with a completely filled airbag, the hose can be "pulled flat" by the airbag shell, this effect applying particularly to first section of the hose that is situated at the height of the opening and surrounded by semicircular stitching.

This in turn means that it is sufficient to enlarge this first section of the hose, which is to say to make the cross-section thereof larger while the second section, which connects to this first section and at the end of which the outlet opening is provided, can remain unchanged. If the airbag is arranged in the motor vehicle in such a way that, in the event of an accident, the shoulder area of a large occupant impacts the second section of the hose, the protective function of the airbag is unchanged and remains high for this large occupant, but nevertheless, the protective effect for a small occupant, whose shoulder does not impact the hose, is improved, because the airbag is softer. In order to ensure that the shoulder of the large occupant impacts the second section of the hose, the airbag is preferably arranged on the backrest of the vehicle seat, at least when the side airbag is assigned to the driver or the passenger. This ensures that the position of the hose relative to the shoulder of an occupant located in the standard sitting position is defined independently of the setting of the seat.

Preferred embodiments of the invention will be apparent from the dependent claims, as well as from the exemplary embodiments described below with reference to the figures:

DETAILED DESCRIPTION

Figure 1:
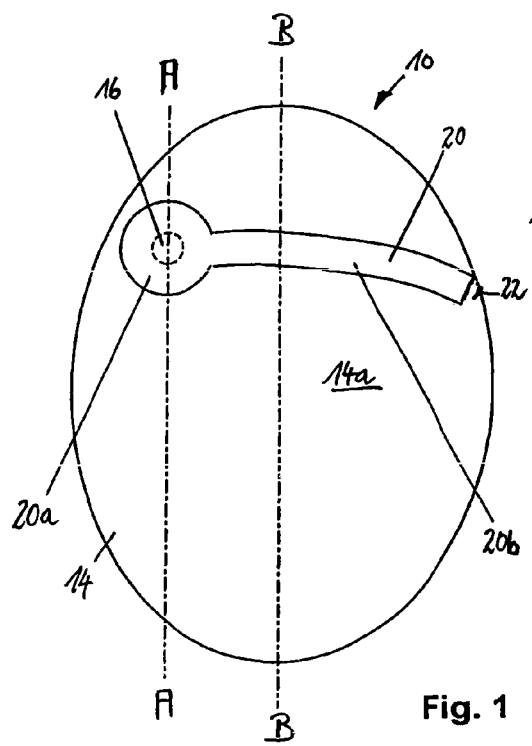
FIG. 1 is a schematic illustration of a side airbag in a completely deployed state, viewed from the occupant to whom it is assigned, in accordance with an embodiment of the present invention.
Figure 2:
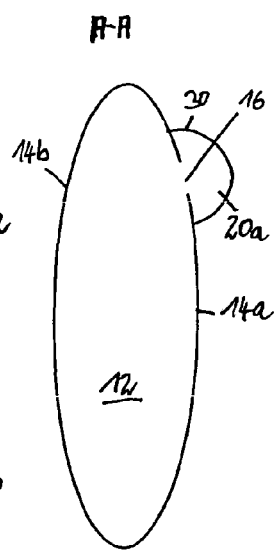
FIG. 2 is a section along the line A-A from FIG. 1.
Figure 3:
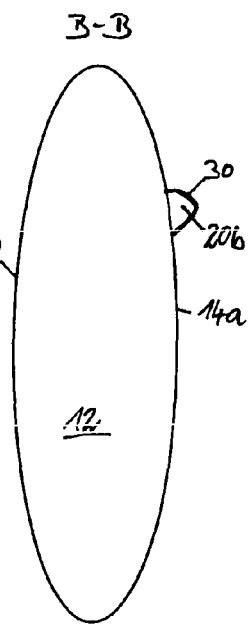
FIG. 3 is a section along the line B-B from FIG. 1.

FIGS. 1, 2 and 3 show a schematic illustration of a side airbag 10 in the completely expanded state, wherein FIG. 1 is a top view from the interior of the vehicle. The side airbag is assigned to an occupant sitting on the left in the vehicle, in particular the driver. FIG. 2 is a section along the line A-A from FIG. 1, and FIG. 3 is a section along the line B-B from FIG. 1.

The airbag 10 comprises an airbag shell 14 having an impact surface 14a and a supporting surface 14b, and if needed, it is filled by a gas generator, which is not shown. In an upper front region of the impact surface 14a, an opening 16 is provided, which serves to ventilate the gas compartment 12 that is surrounded by the airbag shell 14. From this opening 16, a hose 20 extends substantially horizontally forward, exhibiting, in the exemplary embodiment shown in FIG. 1, a certain curvature. At the end of the hose 20, an outlet opening 22 is provided, so that the hose fluidly connects the gas compartment 12 to the outlet opening 22. The hose 20 is formed from a blank 30 that is sewed, glued, or welded onto the impact surface 14a of the airbag shell 14.

As shown in FIG. 1, the hose 20 has a first section 20a and a second section 20b. The first section 20a is situated at the height of the opening 16, and the second section 20b connects the first section 20a to the outlet opening 22 of the hose 20.

As shown, the first section 20a of the hose 20 has a non-constant diameter, and it has the maximum diameter thereof at the site of the opening 16. FIG. 2 shows the maximum cross-section of the hose 20. As illustrated, second section 20b has a constant cross-section; FIG. 3 shows this cross-section. As is apparent particularly from FIGS. 2 and 3, the maximum cross-section of the first section 20a of the hose 20 is considerably larger than the cross-section of the second section 20b. The maximum cross-section of the first section preferably should be at least twice as large as the minimum cross-section of the second section 20b. Because the second section has a constant cross-section in the exemplary embodiment shown here, minimum and maximum cross-sections of this second section 20b are naturally identical. However, it is conceivable for the second section 20b of the hose 20, for example, to widen again at the outlet opening 22, which would not impair the function of the ventilation device formed by the opening 16 and the hose 20.

The terms minimum cross-section and maximum cross-section refer to the state in which the side airbag 10 is completely filled, and gas flows unimpeded and at full force through the hose 20. The respective cross-sections can also be produced in that the airbag 10 is completely filled and the outlet opening 22 is pinched off.

Figure 4:
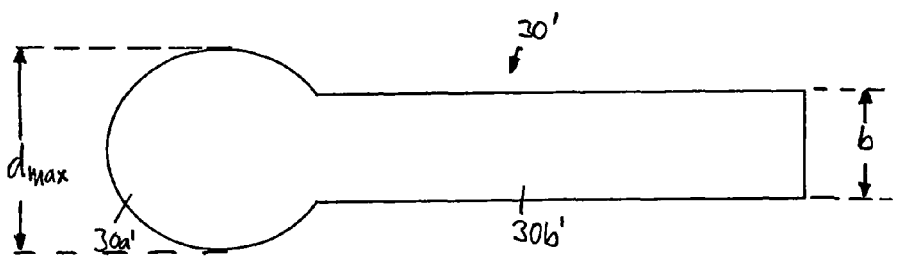
FIG. 4 is an illustration of a blank for a hose.

FIG. 4 shows a blank 30' for a hose 20, as shown in FIG. 1, with the difference that here the second section of the hose 20 is straight rather than curved. It is apparent that this blank 30' has a substantially circular first section 30a' and a substantially rectangular second section 30b'. The width b of the second section 30b' is in this case smaller than the maximum diameter $d_{max}$ of the first section 30a'.

Figure 5:
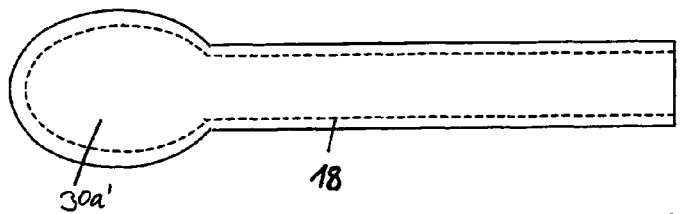
FIG. 5 is the blank from FIG. 4 after it has been sewed onto the airbag shell to form the hose.

FIG. 5 shows the blank 30' from FIG. 4 after it has been sewn onto the airbag shell with stitches 18. It can be seen here that the distance between the lateral edges has been shortened such that a structure as that shown in FIGS. 2 and 3 is produced. The first section 30a' forms a kind of dome in the expanded state.

Figure 6:
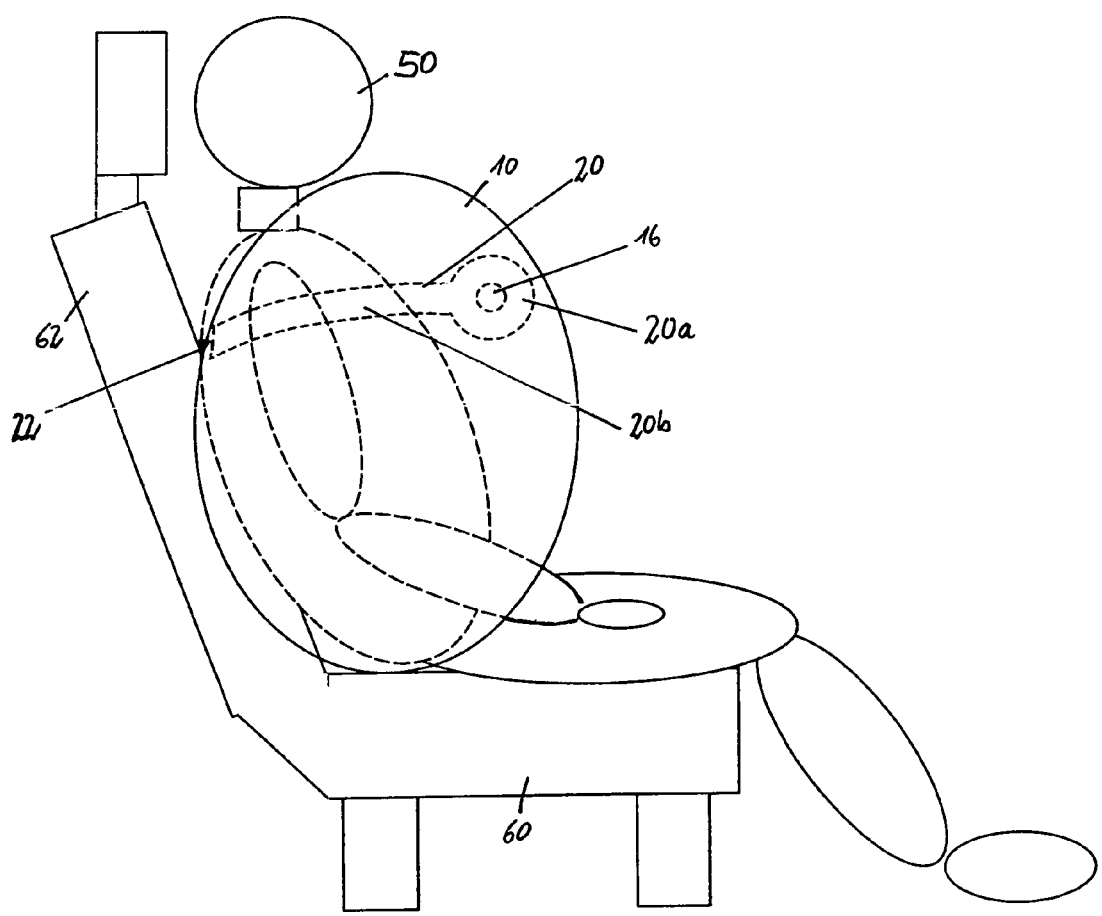
FIG. 6 is the airbag from FIG. 1 in an installed, expanded state viewed from the vehicle door and a large occupant.

As a result of the described structure of the hose 20, with a given cross-section of the second section 20b, and with a given internal pressure in the gas compartment 12, there is a greater gas flow from the gas compartment 12 to the outlet opening 22 compared to an airbag according to the state of the art. This greater gas flow is the result of reduced flow resistance in the first section 20a, where the gas flow has to be diverted substantially at a right angle. The result can be seen in FIGS. 6 and 7:

FIG. 6 shows the airbag shown in FIG. 1 in an installed and fully expanded state. The passenger side of a motor vehicle is shown, and the line of sight is from the direction of the side window. The side airbag 10 is arranged on the backrest 62 of the vehicle seat 60. A large occupant 50 is shown, who is in the standard sitting position. It is apparent that the shoulder area of the occupant 50 is situated at the height of or above the second section 20b of the hose 20. The first section 20a is situated at a point that is located outside of the impact region of the shoulder of the occupant, so that, in general, it is to be preferred that the hose 20 extend from the front to the back toward the outlet opening 22. However, this is not absolutely imperative, as is apparent, for example, from the side airbag in FIG. 1. If the shoulder area of the large occupant 50 impacts the second section 20b of the hose 20, it pinches the same off, and there is no gas emanation, or only little gas emanation from the outlet opening 22. The side airbag therefore behaves similar to the side airbag described in DE 10 2004 048 898 A1, if the second section 20b of the hose has the same cross-section as the hose of DE 10 2004 048 898 A1.

Figure 7:
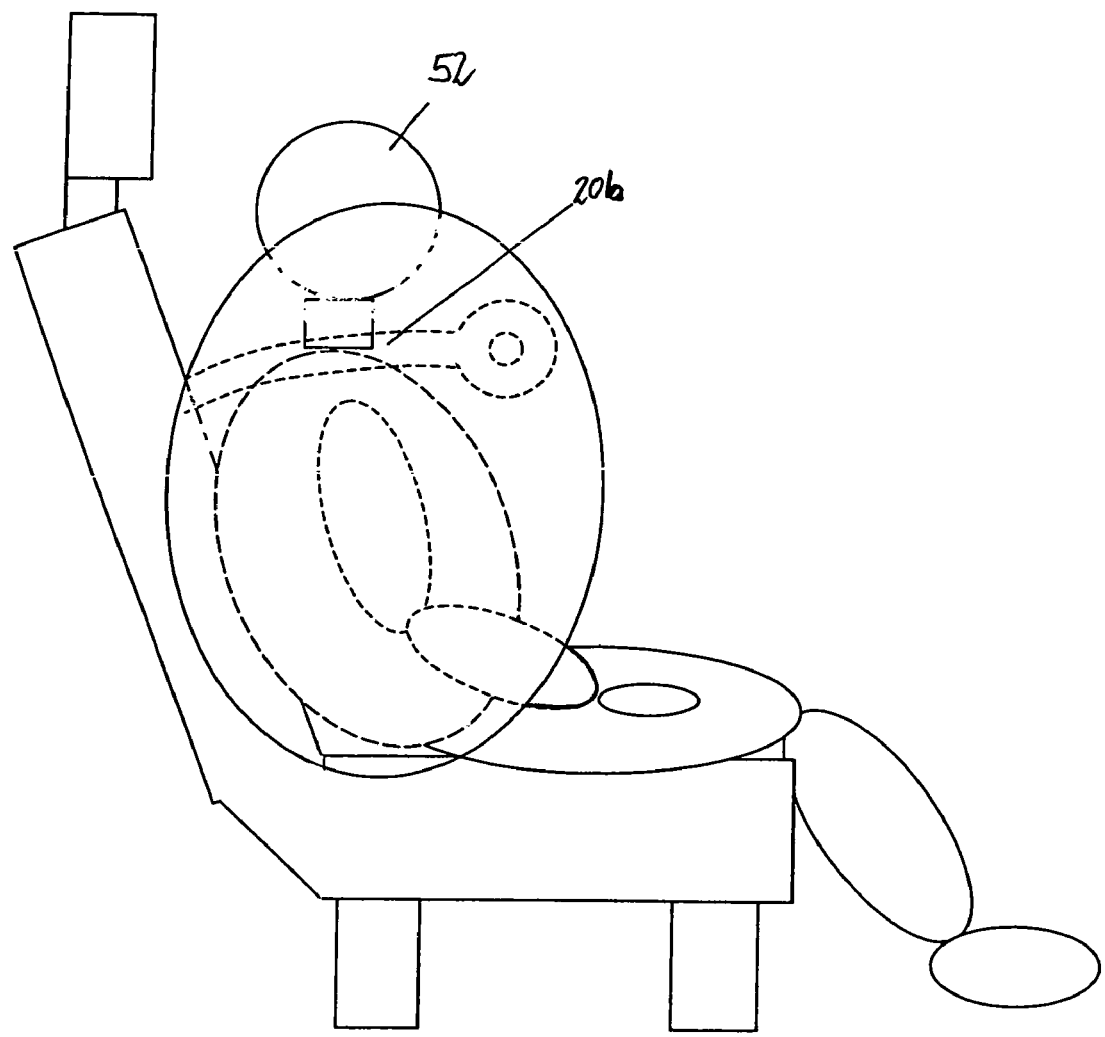
FIG. 7 is the view shown in FIG. 6 with a small occupant.

FIG. 7 shows the situation with a small occupant 52, whose shoulder area is located below the second section 20b of the hose 20. If the small occupant 52 hits the impact surface of the side airbag 10, the second section 20b of the hose 20 is not pinched off, and a relatively large amount of gas flows out of the gas compartment 12 of the side airsack 10, which results in the desired softness.

Figure 8:
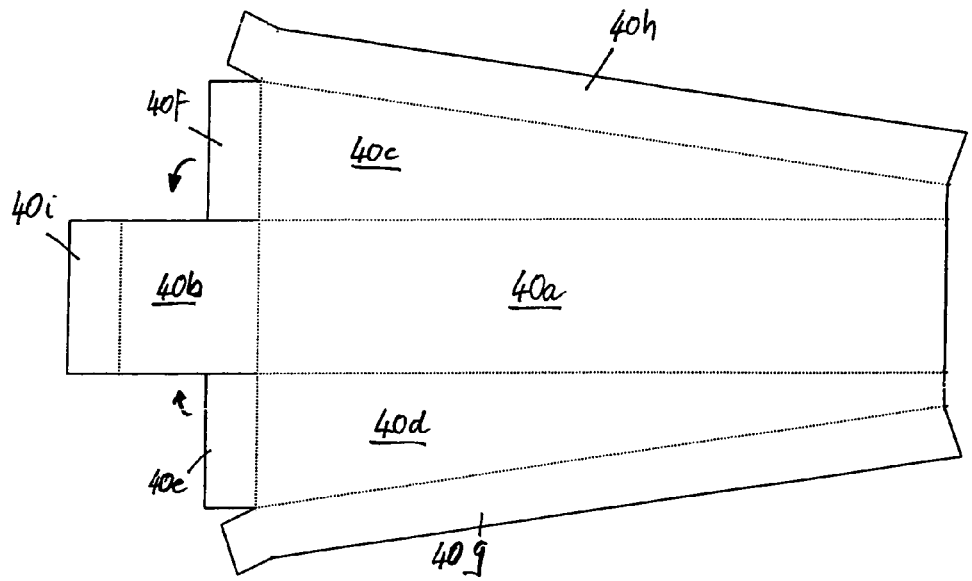
FIG. 8 is an illustration of a blank for a hose according to a second embodiment of the invention.

In the first exemplary embodiment described above, the hose 20 is formed in that a flat blank 30, or 30', is sewn onto the airbag shell (2D design). However, it is also possible to configure the hose 20 as a genuine three-dimensional object, as shown in FIGS. 8 and 9:

FIG. 8 shows a blank 40 for making a hose. The blank has a middle section 40a, an end wall 40b, two lateral walls 40c, and 40d, first connecting sections 40e and 40f, and second connecting sections 40g, 40h, and 40i. When sewn together, the two first connecting sections 40e, 40f are first connected to the end wall 40b. The second connecting sections 40g, 40h, and 40i are used to connect the blank 40 to the airbag shell 14.

Figure 9:
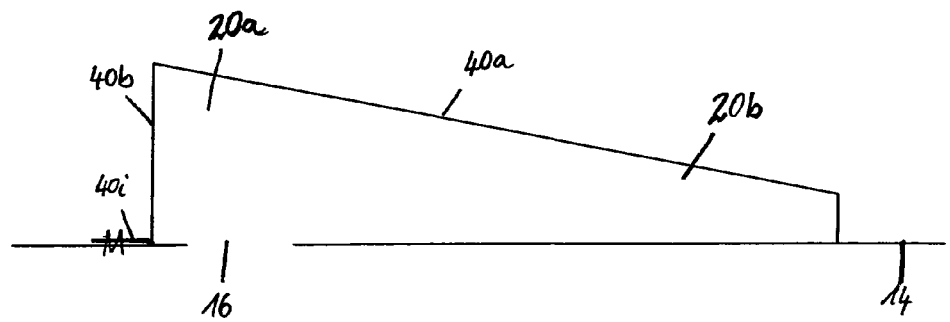
FIG. 9 is a longitudinal section through a hose that is formed by a blank, as in FIG. 8, and the airbag shell.

FIG. 9 shows a longitudinal section through a hose formed in a way which has a substantially rectangular cross-section. It is apparent here that the first section 20a and the second section 20b merge continuously, however, it is also achieved here that the minimum cross-section of the second section 20b is considerably smaller than the maximum cross-section of the first section 20a. In contrast to the first exemplary embodiment, substantially only the height of the hose changes. It is also possible, for example, to provide a hose having triangular cross-sections, wherein the corresponding blank has two lateral walls and one end wall, but no middle section.

Figure 10:
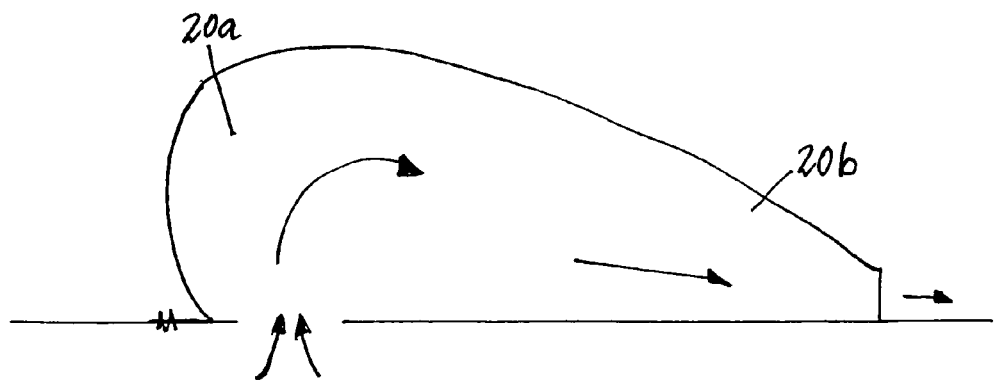
FIG. 10 is the hose shown in FIG. 9 under maximum flow.

FIG. 10 shows the completely filled airbag shown in FIG. 9, when the maximum amount of gas flows through the hose. The hose is then highly inflated, as a result of which the intersecting lines are correspondingly arched. However, the first and second sections 20a, 20b still continuously merge, and the maximum cross-section of the first section is greater than the minimum cross-section of the second section 20b.

A person skilled in the art will appreciate, the above description is meant as an illustration of the implementation of the principles of this invention. This description is not intended to limit the scope or application of this invention in that the invention is susceptible to modification, variation and change, without departing from the spirit of this invention, as defined in the following claims.

The invention claimed is:

1. A side airbag for a motor vehicle, the side airbag comprising:
    an airbag shell that forms a gas compartment and has at least one shell opening, and
    a hose that has an outlet opening, the hose being situated on an outside of the airbag shell and when in a state in which the hose is not under pressure from impact with a vehicle occupant the hose fluidly connecting the shell opening to the outlet opening and thereby to the surrounding area, the hose having a first section that is situated at the height of and about the shell opening and a second section having a length with two ends, one of the ends being connected to the first section and the other end forming the outlet opening, the second section being secured to the outside of the airbag shell along the length of the second section, wherein
    a maximum cross-section of the first section is greater than a minimum cross-section of the second section.

2. The side airbag according to claim 1, wherein the maximum cross-section of the first section is at least twice as large as the minimum cross-section of the second section.

3. The side airbag according to claim 2, wherein the maximum cross-section of the first section is at least three times as large as the minimum cross-section of the second section.

4. A side airbag according to claim 1, wherein the second section has a substantially constant cross-section along the length thereof.

5. A side airbag according to claim 1, wherein the hose is formed by sewing a blank of fabric onto the airbag shell.

6. The side airbag according to claim 5, wherein the blank comprises a first substantially circular section and a second elongated section.

7. The side airbag according to claim 5, wherein the blank comprises at least one end wall and two lateral walls.

8. A vehicle seat on the backrest of which a side airbag according to claim 1 is arranged.

9. The side airbag according to claim 1, wherein the second section of the hose is formed by a portion of the outside of the airbag shell and a portion of a blank affixed to the outside of the airbag shell.

10. The side airbag according to claim 1, wherein the hose extends in a substantially horizontal direction from the shell opening to the outlet opening when the side airbag is in an inflated state.

* * * * *